Feb. 13, 1923.
R. S. MOUNT ET AL
1,445,538
BATTERY COVER
Filed June 18, 1920
Fig. 1.
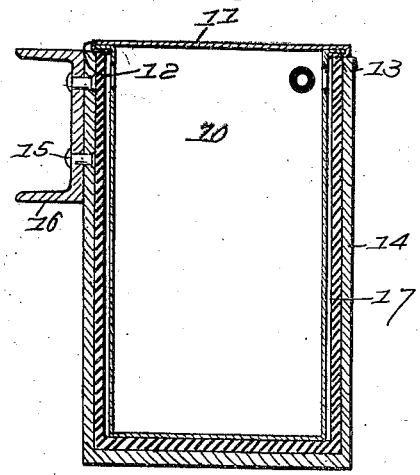
Fig. 2.
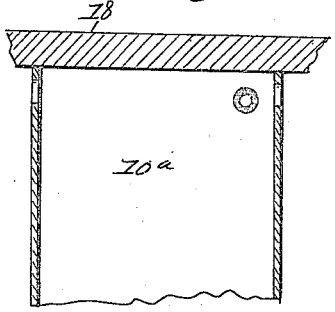
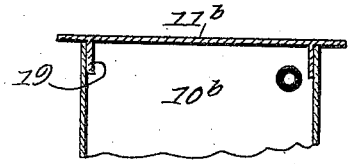
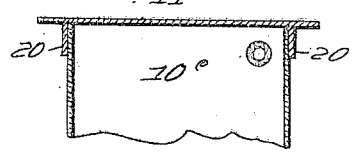
Fig. 3.
Fig. 4.
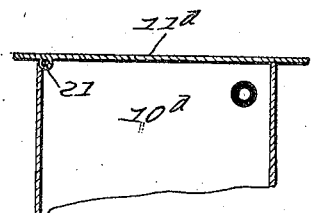
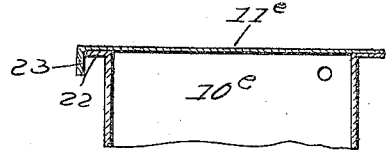
Fig. 5.
Fig. 6.
Inventors
R. S. Mount and
F. C. Wintle,
By G. Sume Talbert
Attorney Patented Feb. 13, 1923.

1,445,538

UNITED STATES PATENT OFFICE.

R. S. MOUNT AND FREDERICK C. WINKLE, OF LEBANON, MISSOURI.

BATTERY COVER.

Application filed June 18, 1920. Serial No. 389,922.

*To all whom it may concern:*

Be it known that R. S. MOUNT and FREDERICK C. WINKLE, citizens of the United States of America, residing at Lebanon, in the county of Laclede and State of Missouri, have invented new and useful Improvements in Battery Covers, of which the following is a specification.

The object of the invention is to provide means particularly adapted for use in connection with automobiles of the Ford and similar types for the protection of the battery used in connection with the ignition and lighting circuits and which ordinarily is exposed and subjected to accumulations of mud and dirt incident to wet roads, rain and the like, it being a particular purpose of the invention to provide a protecting means for the battery which may be applied thereto without necessitating any change in the present equipment of the car in connection with which it may be used either as to the battery or battery casing ordinarily provided with the battery and located either on the running board or beneath the car floor, and with this object in view, the invention consists of a construction and combination of parts, of which a preferred embodiment is shown in the accompanying drawings, wherein:—

Figure 1, is a sectional view of a protecting device, embodying the invention applied in operative position to a battery casing of the type usually located at the side of a car, as for example above or on the running board.

Figure 2, is a similar view of the device for use in connection with batteries which are located beneath the floor of the car.

Figures 3, 4, 5 and 6 are similar views of a battery protecting box having modified forms of covers adapted for selective or interchangeable use according to the preferences of the consumer or manufacturer.

In the construction illustrated in Figure 1, the battery protecting and receiving box 10 embodying the invention is constructed of sheet metal of dimensions adapted to snugly fit a battery box of the ordinary form (not shown) and fitted with a removable slide or cover 11 adapted to be slid into place and provided at its edges with grooved guides 12 for receiving lateral flanges 13 at the upper edges of the walls of the box. Said protecting box having been fitted upon the battery encloses and effectually protects the same and may be seated in the ordinary battery holder or casing 14 which in the construction illustrated is riveted or otherwise secured as indicated at 15 to a side beam or bar 16 forming a part of the car. Said casing as shown, is in the usual practice provided with an inner insulating lining 17 of asbestos or like material.

In the construction illustrated in Figure 2, the battery receiving and protecting box 10ª embodying the invention, is adapted to be used in connection with a battery located beneath the floor of the car, in which event the free end thereof may be effectually closed by the floor of the car as indicated at 18.

In Figure 3, the battery receiving and protecting box 10ᵇ is shown fitted with a lid or cover 11ᵇ having depending flanges 19 which fit within the upper edges of the walls of the box while in Figure 4, the box 10ᶜ is fitted with a cover 11ᶜ of which the flanges 20 extend downward exteriorly of the upper edges of the wall of the box, or battery itself.

In Figure 5, a further modification is illustrated wherein the box 10ᵈ is provided with a lid or cover 11ᵈ hinged as at 21 to the side wall of the box while in Figure 6, the box 10ᵉ is provided at the upper edges of its walls with lateral flanges 22 while the lid or cover 11ᵉ is provided at one edge with a depending lip 23 serving as a convenient grip by which the same may be readily removed to give access to the battery.

The invention having been described, what is claimed as new and useful is:—

The combination with an automobile battery containing case having an open top, of an insulating lining disposed against the bottom and side walls of the case, and a sheet metal battery receiving box disposed within the case with its walls in contact with the walls of the lining, the said box being adapted to snugly fit the battery and having a removable closure overlapping the upper edge of the said case.

In testimony whereof they affix their signatures.

R. S. MOUNT.
FREDERICK C. WINKLE.